United States Patent [19]

Coyne

[11] 4,318,586

[45] Mar. 9, 1982

[54] DISTRIBUTIVE COUPLERS FOR FIBER OPTICS

[75] Inventor: Lawrence J. Coyne, Danbury, Conn.

[73] Assignee: Bunker Ramo Corporation, Oak Brook, Ill.

[21] Appl. No.: 136,883

[22] Filed: Apr. 3, 1980

Related U.S. Application Data

[63] Continuation of Ser. No. 938,585, Aug. 31, 1978, abandoned.

[51] Int. Cl.³ ............................................. G02B 7/26
[52] U.S. Cl. ................................. 350/96.16; 350/96.18
[58] Field of Search ............... 350/96.16, 96.18, 96.19, 350/96.20, 96.21, 96.22

[56] References Cited

U.S. PATENT DOCUMENTS

| | | | |
|---|---|---|---|
| 2,190,294 | 2/1940 | Mili | 352/198 |
| 3,033,071 | 5/1962 | Hicks, Jr. | 350/96.25 |
| 3,508,807 | 4/1970 | Mayer | 350/96.18 |
| 3,829,195 | 8/1974 | Rawson | 350/96.18 |
| 3,874,780 | 4/1975 | Love | 350/96.16 |
| 3,874,781 | 4/1975 | Thiel | 350/96.16 |
| 3,883,223 | 5/1975 | Hudson | 350/96.16 |
| 3,901,581 | 8/1975 | Thiel | 350/96.16 |
| 3,912,364 | 10/1975 | Hudson | 350/96.16 |
| 3,932,023 | 1/1976 | Humer | 350/96.18 |
| 3,937,557 | 2/1976 | Milton | 350/96.16 |
| 4,013,342 | 3/1977 | Narodny | 350/96.13 |
| 4,030,810 | 6/1977 | Khoe | 350/96.20 |
| 4,050,784 | 9/1977 | Kobayashi | 350/96.18 |
| 4,082,421 | 4/1978 | Auracher et al. | 350/96.22 |
| 4,111,524 | 9/1978 | Tomlinson | 350/96.19 |

FOREIGN PATENT DOCUMENTS

| | | |
|---|---|---|
| 7808787 | 7/1978 | Fed. Rep. of Germany . |
| 1369010 | 6/1964 | France . |
| 2331803 | 6/1977 | France . |
| 1017354 | 1/1966 | United Kingdom . |
| 1386734 | 3/1975 | United Kingdom . |
| 1399953 | 7/1975 | United Kingdom . |
| 1479398 | 7/1977 | United Kingdom . |
| 1485695 | 9/1977 | United Kingdom . |
| 1500038 | 2/1978 | United Kingdom . |
| 1500257 | 2/1978 | United Kingdom . |
| 1511180 | 5/1978 | United Kingdom . |
| 1528242 | 10/1978 | United Kingdom . |
| 1545239 | 5/1979 | United Kingdom . |

OTHER PUBLICATIONS

*Electronics Letters,* "New Star Coupler Compatible with Single Multimode Fiber Data Links", vol. 12, No. 6 (3/18/76).
*Principles of Optics.*
*Physical Theory of Image Formation.*
*Bunker Ramo Fiber Optic Seminar,* "An Experimental Fiber Optic Data Bus System and Design Considerations", by D. R. Porter (2/21-23/78).
*Electronic Engineering,* "Fiber Optic Star Coupler for Aircraft Data Bus", vol. 47, No. 571 (9/23/74).
*Applied Optics,* "Optical Access Couplers and a Comparison of Multiterminal Fiber Communication Systems", by A. F. Milton and A. B. Lee, vol. 15, No. 1 (1/76).
*Applied Optics,* "The Star Coupler: A Unique Interconnection Component For Multimode Optical Waveguide Communications Systems", by Marshall C. Hudson and Frank L. Thiel, vol. 13, No. 11 (11/74).
*Bunker Ramo Fiber Optic Seminar,* "Coupling Considerations in Optical Data Buses", By Frank L. Thiel (2/21-23/78).

*Primary Examiner*—John D. Lee
*Attorney, Agent, or Firm*—John R. Hoffman; Dale A. Kubly

[57] ABSTRACT

A distributive coupler for use with at least one set of optical fibers includes a fiber optic terminal for supporting the end portions of each set of optical fibers. In a reflective mode, the coupler is adapted for use with one set of optical fibers by directing light transmitted through any one or more of the optical fibers back onto the set of optical fibers. A reflecting element is utilized to reflect transmitted light toward the set of optical fibers and a focusing element is utilized to focus reflected light onto the set of optical fibers. In a transmissive mode, the coupler is adapted for use with two sets of optical fibers by directing light transmitted through any one or more of the optical fibers onto the other set of optical fibers. A shaping element is utilized for shaping light transmitted toward the other set of optical fibers and a focusing element is utilized for focusing transmitted light onto the other set of optical fibers. The coupler also includes telescoping housing segments for adjusting the position of the optical elements relative to each fiber optic terminal. With these features of construction, the distributive coupler produces substantially uniform illumination of all of the optical fibers of a set of optical fibers.

22 Claims, 5 Drawing Figures

FIG. 1

DISTRIBUTIVE COUPLERS FOR FIBER OPTICS

This is a continuation application of Ser. No. 938,585, filed Aug. 31, 1978, now abandoned.

BACKGROUND OF THE INVENTION

The present invention relates to a distributive coupler and, more particularly, to a distributive coupler useful with at least one set of optical fibers.

In recent years, fiber optic transmission lines made up of one or more optically conductive fibers arranged to form a flexible cable for conveying light from one location to another have come into increasing use. The applications have varied although one particularly significant application has been conveying data from one location to another by modulating a light source with data to be transmitted at one end of the cable and recovering the data at the other end of the cable by a photosensitive detector. Since the data is conveyed by a medium not subject to radio frequency interference or detection, fiber optic transmission lines are particularly well adapted for applications requiring a high degree of security like those found in the data processing field.

With the increasing use of fiber optic transmission lines, the need developed for connectors capable of joining segments of cables with minimum detriment to the optical transmission path. It has been found that precise axial, angular and lateral alignment between a pair of fiber optic cables can be achieved by terminating the optical fibers of the cables in connector pin assemblies in such a way as to provide concentric alignment with respect to the outer dimensions of the connector pins. When a pair of connector pins are concentrically and accurately aligned, the ultimate result is that the optical fibers will likewise be axially, angularly and laterally aligned for efficient light transfer.

While the connector art is still developing, connector pin assemblies are available today for terminating the optical fibers of the cables so that they are concentrically and accurately aligned within accepted tolerances. More recently, there has been a growing interest in, and recognition of the need for, developing suitable distributive couplers for distributing light among fiber optic transmission lines so that one or two way communication is possible from any one or more optical fibers of a set of optical fibers to all of the optical fibers of the same or a different set of optical fibers. This interest has been spawned primarily by the need to distribute an optical signal to a plurality of locations. More particularly, distributive couplers have been sought which operate in the manner described while producing substantially uniform illumination of an entire set of optical fibers utilizing the light transmitted through any one or more optical fibers without excessive loss of light or excessive distortion of light signal pulses. Additionally, a distributive coupler has been needed to make it possible to easily adjust the optical components for use with different types of optical fibers and different pluralities of optical fibers in a manner capable of fabrication at reasonable cost and to acceptable tolerances.

SUMMARY OF THE INVENTION

Accordingly, the present invention, in a broad aspect, is directed to a distributive coupler for use with at least one set of optical fibers. It includes means for supporting the end portions of the optical fibers, means for directing light transmitted through any one or more of the optical fibers onto an entire set of optical fibers, and means for adjusting the position of the light directing means relative to the fiber supporting means. With these features of construction, the distributive coupler produces substantially uniform illumination of all of the optical fibers of the entire set of optical fibers.

More specifically, the coupler includes a fiber optic terminal for supporting the end portions of each set of optical fibers. In a reflective mode, the coupler is adapted for use with one set of optical fibers by directing light transmitted through any one or more of the optical fibers back onto the set of optical fibers. A reflecting element is utilized to reflect transmitted light toward the set of optical fibers and a focusing element is utilized to focus reflected light onto the set of optical fibers. In a transmissive mode, the coupler is adapted for use with two sets of optical fibers by directing light transmitted through any one or more of the optical fibers onto the other set of optical fibers. A shaping element is utilized for shaping light transmitted toward the other set of optical fibers and a focusing element is utilized for focusing transmitted light onto the other set of optical fibers. The coupler also includes telescoping housing segments for adjusting the position of the optical elements relative to each fiber optic terminal.

In the reflective mode, the distributive coupler includes means for supporting the end portions of the optical fibers of one set of optical fibers. It also includes means for directing light transmitted through any one or more of the optical fibers onto the set of optical fibers wherein the light directing means for this mode includes means for reflecting transmitted light toward the set of optical fibers and means for focusing reflected light onto the set of optical fibers with the light focusing means being disposed between the fiber supporting means and the light reflecting means. Further, the reflective mode distributive coupler includes means for adjusting the position of the light directing means relative to the fiber supporting means to produce substantially uniform illumination of the set of optical fibers.

Additional details of the reflective mode distributive coupler include a housing having first and second housing segments telescopically related to one another so as to define at least a portion of the position adjusting means. Preferably, the first and second housing segments are complementarily shaped having a common longitudinal axis and include means for supporting the light focusing means or lens and the light reflecting means or mirror in spaced apart relation within the housing. Advantageously, the light focusing means or lens is supported in one of the housing segments and the light reflecting means or mirror is supported in the other of the housing segments so as to be movable toward and away from the light focusing means or lens by utilizing the portion of the position adjusting means permitting the housing segments to be moved telescopically relative to one another. In addition, the reflective mode distributive coupler includes a fiber optic terminal having a sleeve supporting the end portions of the optical fibers of the set of optical fibers in tightly packed relation parallel to one another thereby defining light transmission paths extending parallel to the common longitudinal axis of the housing segments.

In the transmissive mode, the distributive coupler includes means for supporting the end portions of the optical fibers of two sets of optical fibers in spaced relation to one another. It also includes means for directing light transmitted through any one or more of the optical fibers onto the other set of optical fibers wherein the light directing means for this mode includes means for shaping light transmitted from one set of optical fibers and means for focusing transmitted light onto the other set of optical fibers. Further, the transmissive mode distributive coupler includes means for adjusting the position of the light directing means relative to the fiber supporting means to produce substantially uniform illumination of the other set of optical fibers.

Additional details of the transmissive mode distributive coupler also include a housing having first and second housing segments telescopically related to one another so as to define at least a portion of the position adjusting means. Preferably, the first and second housing segments are complementarily shaped having a common longitudinal axis and include means for supporting the light shaping means or lens and the light focusing means or lens within the housing. Advantageously, the light shaping means or lens is supported in one of the housing segments and the light focusing means or lens is supported in the other of the housing segments so as to be movable toward and away from the light shaping means or lens by utilizing the portion of the position adjusting means permitting the housing segments to be moved telescopically relative to one another. In addition, the transmissive mode distributive coupler also includes a fiber optic terminal associated with each of the housing segments each of which includes a sleeve supporting the end portions of the optical fibers of one of the sets of optical fibers in tightly packed relation parallel to one aother thereby defining light transmission paths extending parallel to the common longitudinal axis of the housing segments.

The present invention is therefore directed to a distributive coupler for distributing light among fiber optic transmission lines so that one or two way communication is possible from any one or more optical fibers of a set of optical fibers to all of the optical fibers of the same or a different set of optical fibers. It is a further object of the invention to provide a coupler capable of distributing an optical signal to a plurality of locations while operating to produce substantially uniform illumination of an entire set of optical fibers utilizing the light transmitted through any one or more optical fibers without excessive loss of light or excessive distortion of light signal pulses. It is still a further object of the invention to provide a distributive coupler which facilitates easy adjustment of the optical components for use with different types of optical fibers and different pluralities of optical fibers in a manner capable of fabrication at reasonable cost and to acceptable tolerances. Other objects and advantages of the present invention will be appreciated from a consideration of the details of construction and operation set forth in the accompanying specification, claims and drawings.

BRIEF DESCRIPTION OF THE DRAWINGS

The novel features of the present invention are set forth with particularity in the appended claims. The invention, together with the further objects and advantages thereof, may best be understood by reference to the following description taken in conjunction with the accompanying drawings. In the drawings, like reference numerals identify like elements in the several figures, in which:

DETAILED DESCRIPTION OF THE PREFERRED EMBODIMENT

In the illustrations given, the reference numerals 10, 10′, and 100 designate several embodiments of a distributive coupler in accordance with the present invention. In each of the embodiments, the coupler is adapted for use with at least one set 12 of optical fibers 14 and includes means 16 for supporting the end portions of the optical fibers 14 and means 18 for directing light transmitted through any one or more of the optical fibers 14 onto the entire set 12 of optical fibers 14. The coupler 10 further includes means 20 for adjusting the position of the light directing means 18 relative to the fiber supporting means 16 to produce substantially uniform illumination of the entire set 12 of optical fibers 14.

Figure 1:
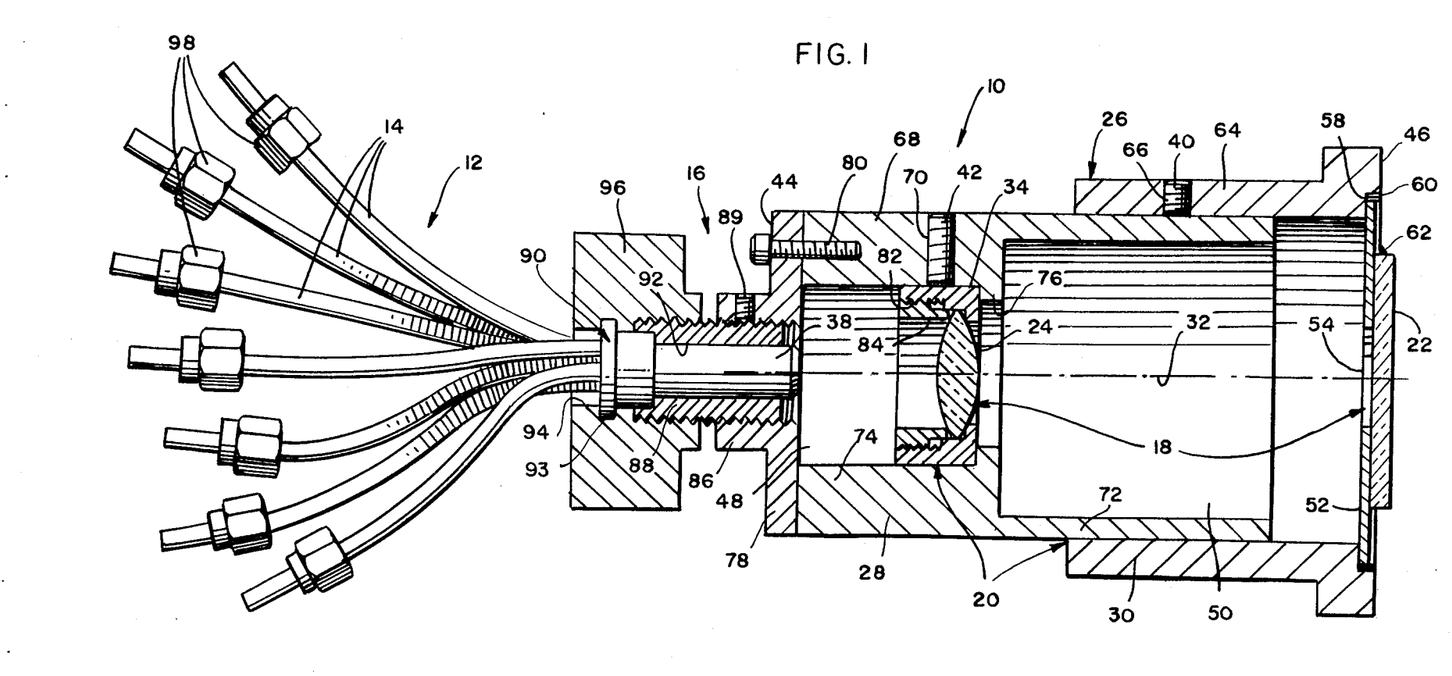
FIG. 1 is a sectional view of a reflective mode distributive coupler constructed in accordance with the present invention.

In a reflective mode (as shown in FIG. 1), the distributive coupler 10 is adapted for use with one set 12 of optical fibers 14 to direct light transmitted through any one or more of the optical fibers 14 back onto the set 12 of optical fibers. The reflective mode distributive coupler 10 includes a single fiber supporting means 16. It also includes light directing means 18 wherein the light directing means comprises means 22 for reflecting transmitted light toward the set 12 of optical fibers 14 and means 24, disposed between the fiber supporting means 16 and the light reflecting means 22, for focusing reflected light onto the set 12 of optical fibers 14. The reflective mode distributive coupler 10 further includes means 20 for adjusting the position of the light directing means 18 relative to the fiber supporting means 16. With these features of construction, the distributive coupler 10 produces substantially uniform illumination of the set 12 of optical fibers 14 in the reflective mode.

Figures 2, 3:
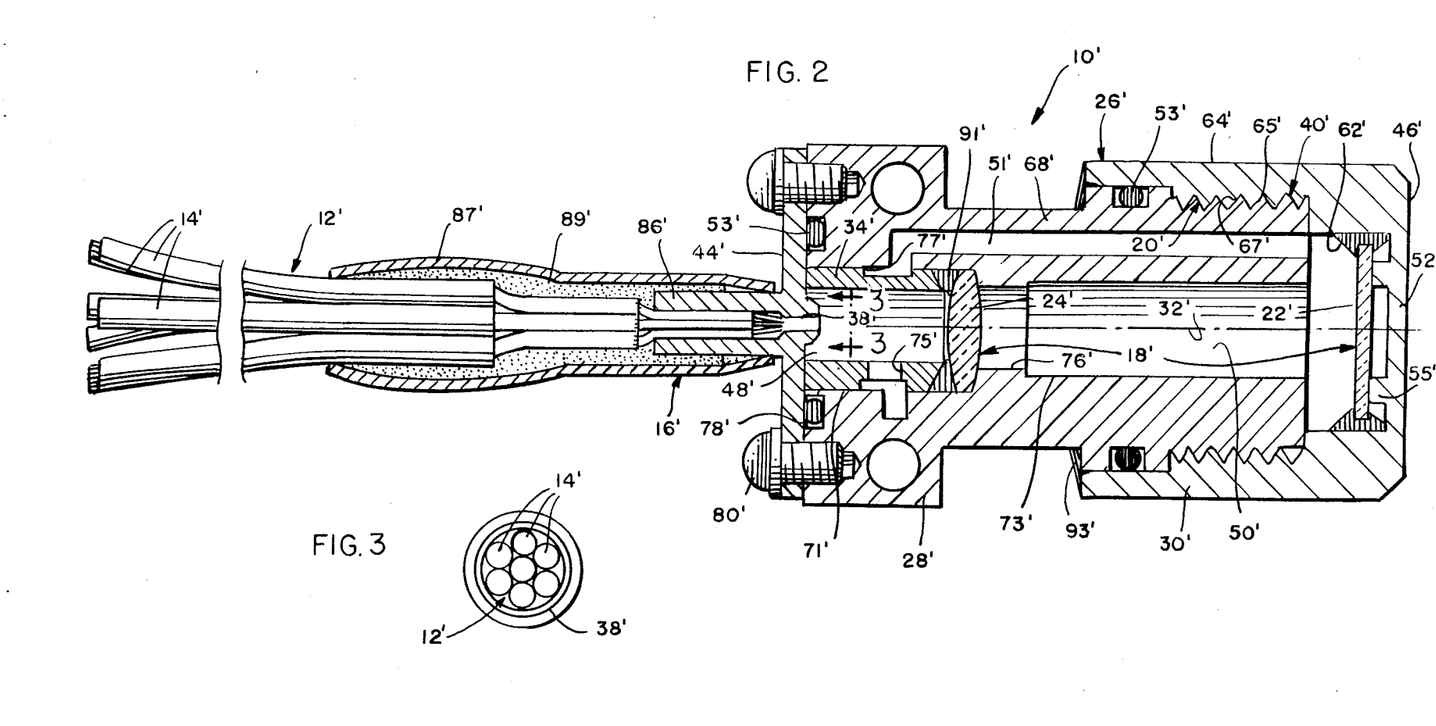
FIG. 2 is a sectional view of an alternative embodiment of a reflective mode distributive coupler constructed in accordance with the present invention.
FIG. 3 is an enlarged end view of a fiber optic terminal sleeve taken on the line 3—3 of FIG. 2.

More particularly, the light focusing means 24 and the light reflecting means 22 (illustrated in FIG. 1) are disposed within a housing 26 in the reflective mode coupler 10. The housing 26 includes first and second housing segments 28 and 30 telescopically related to one another and lying along a common longitudinal axis 32 so as to define at least a portion of the position adjusting means 20. The first and second housing segments 28 and 30 are complementarily shaped and include means 34 for supporting the light focusing means 24 in spaced apart relation to the light reflecting means 22 (described hereinafter) such that the light focusing means 24 is supported in one of the housing segments 28 and the light reflecting means 22 is supported in the other of the housing segments 30 so as to be movable toward and away from the light focusing means 24 by utilizing the portion of the position adjusting means 20 permitting the housing segments 28 and 30 to be moved telescopically relative to one another. The housing 26 further includes a fiber optic terminal defining the fiber supporting means 16 and lying along the common longitudinal axis 32 of the first and second housing segments 28 and 30. Advantageously, the fiber optic terminal 16 includes a sleeve 38 supporting the end portions of the optical fibers 14 in tightly packed relation (as shown in FIG. 3) such that the end portions thereof are maintained parallel to one another and to the common longitudinal axis 32 thereby defining light transmission paths extending parallel to the common longitudinal axis 32 of the housing segments 28 and 30.

Referring again to FIG. 1, the sleeve 38 supports the end faces of the optical fibers 14 in optical communication with the light focusing means 24 and the light reflecting means 22. The sleeve 38 is advantageously associated with the one of the housing segments 28 supporting the light focusing means 24 with the light focusing means 24 being disposed between the light reflecting means 22 and the end faces of the optical fibers 14. Further, the optical fibers 14 are preferably supported such that the end faces thereof are maintained in a plane perpendicular to the light transmission paths of the optical fibers 14.

As illustrated in FIG. 1, the light focusing means 24 is a focusing element such as a lens and the light reflecting means 22 is a reflecting element such as a mirror both of which are disposed in the light transmission paths of all of the optical fibers 14. The mirror 22 is movable toward and away from the end faces of the optical fibers 14 and the lens 24 by utilizing the portion of the position adjusting means 20 permitting the housing segments 28 and 30 to be moved telescopically relative to one another. The lens 24 is advantageously mounted in a collar 34 within the housing 26 and is separately movable toward and away from the end faces of the optical fibers 14 so as to define another portion of the position adjusting means 20. Additionally, the housing segment 30 includes means 40 for securing the housing segments 28 and 30 and the housing segment 28 includes means 42 for securing the collar 34 which together permit the lens 24 and the mirror 22 to be secured in selected positions of adjustment relative to the end faces of the optical fibers 14 so as to produce substantially uniform illumination of all of the optical fibers 14 of the set 12 of optical fibers.

It will be appreciated that the lens 24 and the mirror 22 (illustrated in FIG. 1) are disposed perpendicular to the common longitudinal axis 32 and the light transmission paths of the optical fibers 14 with the sleeve 38 being disposed at one end 44 of the housing 26, the mirror 22 being disposed at the other end 46 of the housing 26, and the lens 24 being disposed intermediate the ends 44 and 46 of the housing 26. The lens 24, therefore, divides the housing 26 into two separate chambers 48 and 50 extending through the housing 26 along the common longitudinal axis 32 and the light transmission paths of the optical fibers 14 with the two separate chambers preferably being in communication with one another. As will be described more fully in connection with the alternative embodiment of FIG. 2, the chambers can communicate through a passageway extending through at least one of the housing segments and the housing can include means for sealing the chambers against exposure to conditions external of the housing.

Referring again to FIG. 1, it will be appreciated that the housing 26 is generally tubular in shape and the housing segment 30 supports an end cap 52 at the end 46 thereof. The housing segment 30 includes an annular recess 58 of a depth generally the same as the thickness of the end cap 52 and of a diameter generally the same as the diameter of the end cap 52. The end cap 52 which has a central aperture 54 is retained in the annular recess 58 by any suitable securing means such as epoxy (as at 60). The mirror 22 is supported by the end cap 52 and need only be dimensioned smaller than the end cap 52 but larger than the central aperture 54. As will be seen, the mirror 22 is likewise secured to the end cap 52 by any suitable means such as epoxy (as at 62).

As will be seen, the long cylindrical wall 64 of the housing segment 30 includes a through hole 66 at some point on the circumference. The through hole 66 is provided to accommodate, for example, a set screw 40 defining the means for securing the telescoping housing segments 28 and 30 in a selected position of adjustment. It will be appreciated that this facilitates movement between the housing segments 28 and 30 when it is desired to make an optical adjustment to the coupler 10. The housing segment 28 likewise includes a cylindrical wall 68 having a through hole 70 at some point about the circumference provided, for example, to accommodate a set screw 42 defining the means for securing the collar 34 in a selected position of adjustment. With these features of construction, the reflective mode coupler 10 is well suited for producing substantially uniform illumination of the entire set 12 of optical fibers utilizing the light transmitted through any one or more optical fibers 14 by making appropriate adjustment in the relative position of the optical components 14, 22 and 24.

Referring again to FIG. 1, it will be seen that the housing segment 28 includes a major inner diameter wall portion 72 and a minor inner diameter wall portion 74. The collar 34 is mounted for sliding movement along the common longitudinal axis 32 within the minor inner diameter wall portion 74. It will be seen that an inwardly extending annular flange 76 is disposed at the juncture between the major inner diameter wall portion 72 and the minor inner diameter wall portion 74 which acts as a stop for the collar 34 restricting axial movement of the collar in a direction away from the sleeve 38. The end 44 of the housing segment 28 includes a cap 78 which is secured to the minor inner diameter wall portion 74 by screws (as at 80). Of course, the cap 78 can be removed to provide access to the collar 34 for facilitating adjustment of the position of the collar 34 after loosening the set screw 42.

As shown, the collar 34 can be adjusted between a position in which it is contacting the annular flange 76 and any other position nearer the sleeve 38 in which it is still opposite the through hole 70 for securement by the set screw 42. The collar 34 therefore permits fine adjustment of the lens 24 so as to assure substantially uniform illumination of the entire set 12 of optical fibers utilizing the light transmitted through any one or more optical fibers 14. Further, it will be seen that the collar 34 includes internal threads 82 which cooperate with an externally threaded ring 84 to secure the lens 24 within the collar 34 permitting replacement of the lens 24 by another lens in a quick and easy fashion. The threaded ring 84 may simply be unthreaded from the internally threaded collar 34, the lens 24 removed, and the replacement lens installed into the collar 34. In addition, the collar 34 can be placed in the housing segment 28 with the lens side of the collar nearer the sleeve 38 or nearer the mirror 22 to provide an even wider range of adjustment if desired.

Referring to the cap 78, it includes an internally threaded outwardly extending tubular portion 86. The tubular portion 86 cooperates with an externally threaded adapter 88 thereby defining the fiber optic terminal 16. It will be seen that the adapter 88 is dimensioned and shaped to receive a fiber optic pin 90, which includes the sleeve 38, through a central opening 92 therein. It will be appreciated that the threaded adapter 88 permits adjustment of the fiber optic pin 90 which may thereafter be secured in a selected position of adjustment by means of set screw 89. The fiber optic pin 90 also includes an outwardly extending annular flange 93 which cooperates with an inwardly extending flange 94 of an internally threaded nut 96. As shown in FIG. 1, the fiber optic pin 90 can be inserted into the externally threaded adapter 88 and the internally threaded nut 96 can be threaded onto the externally threaded adapter 88 to secure the sleeve 38 in position within the fiber optic terminal 16.

While forming no part of the present invention, the optical fibers 14 comprise lead segments adapted for connection to fiber optic transmission lines. The fiber optic connectors 98 have been shown merely to represent that the optical fibers 14 are to be connected to fiber optic transmission lines. It is also within the purview of the present invention to simply form the distributive coupler with optical fibers or fiber optic transmission lines (such as 14) which are sufficiently long to extend to desired receiving stations. The optical fibers 14 could also be fitted with other types of connectors or splicers to secure the optical fibers to suitable fiber optic transmission lines. Persons skilled in the art will readily recognize the numerous means for joining the distributive coupler 10 to suitable fiber optic transmission lines.

Referring to FIG. 2, the alternative embodiment reflective mode distributive coupler 10' employs inventive principles in common with the distributive coupler 10 of FIG. 1. It should be noted that corresponding elements of the two embodiments have been given corresponding reference numerals in the drawings with the exception that the numerals assigned to elements in the alternative embodiment are prime for purposes of distinction. In order to avoid repetition, the distributive coupler 10' will be described only to the extent it differs from the distributive coupler 10 with the understanding that description of the distributive coupler 10 is otherwise equally applicable to the distributive coupler 10'.

As will be seen, the lens 24' divides the housing 26' into two separate chambers 48' and 50'. The chambers 48' and 50' extend through the housing 26' along the common longitudinal axis 32' and the light transmission paths of the optical fibers 14'. The two separate chambers 48' and 50' are in communication with one another through a passageway 51' extending through the housing segment 28'. Moreover, the housing 26' includes means 53' for sealing the chambers 48' and 50' against exposure to conditions external of the housing 26'.

Referring again to FIG. 2, it will be appreciated that the housing segments 28' and 30' are generally tubular in shape. The housing segment 30' includes an integral end portion 52' having an internal annular ring 55'. As will be seen, the mirror 22' is supported against the ring 55' by any suitable means such as epoxy (as at 62').

As shown, the long cylindrical wall 64' of the housing segment 30' includes internal threads as at 65' to cooperate with external threads 67' on the generally cylindrical wall 68' of the housing segment 28'. It will be appreciated that this defines the position adjusting means 20' facilitating telescoping movement between the housing segments 28' and 30' when it is desired to make an optical adjustment to the coupler 10' as well as defining the means 40' for securing the telescoping housing segments 28' and 30' in a selected position of adjustment. With these features of construction, the coupler 10' is well suited for producing substantially uniform illumination of the entire set 12' of optical fibers utilizing the light transmitted through any one or more optical fibers 14' by making appropriate adjustments in the relative position of the optical components 14', 22' and 24'.

Referring again to FIG. 2, it will be seen that the housing segment 28' includes a major inner diameter wall portion 71' and a minor inner diameter wall portion 73'. The collar 34' is mounted along the common longitudinal axis 32' within the major inner diameter wall portion 71'. As shown, the collar 34' includes a through hole 75' and a circumferential cut-out 77' through which the chamer 48' communicates with the passageway 51' and, hence, the chamber 50'.

As will be seen, the cap 78' includes an outwardly extending tubular portion 86'. The tubular portion 86' serves as a guide and support for the optical fibers 14'. It will be appreciated that the optical fibers 14' are stripped at various points along their lengths from the outer jacket, to the strength members, to the inner jacket, to the fibers themselves prior to the point the optical fibers 14' enter the sleeve 38'. The optical fibers 14' are epoxied in the sleeve 38' and the tubular portion 86'. Additionally, the optical fibers 14' are secured to the distributive coupler 10' by using a length of heat shrink tubing 87' extending from near the point the tubular portion 86' joins the cap 78' to rearwardly of the point the outer jacket is trimmed away with epoxy being used (as at 89') to secure the optical fibers 14' to one another, the tubular portion 86' and the heat shrink tubing 87'.

Further details of the alternative embodiment reflective mode distributive coupler 10' include the utilization of an O-ring 91' between the collar 34' and the lens 24'. It is also contemplated that the slot (not shown) in the head of the screws 80' and the joint between the housing segments 28' and 30' (as at 93') can be epoxied, particularly for applications requiring a hermetically sealed unit, to discourage disassembly by the user and to lock the distributive coupler into a desired position of adjustment. If the distributive coupler 10' is to be hermetically sealed, the housing segment 30' may be unthreaded relative to the housing segment 28' until it completely clears the O-ring 53', the coupler can be placed into a vacuum for a period of time, and the vacuum chamber can be filled with dry nitrogen immediately after which the housing segment 30' can again be threaded into position overlapping the O-ring 53'.

Figure 4:
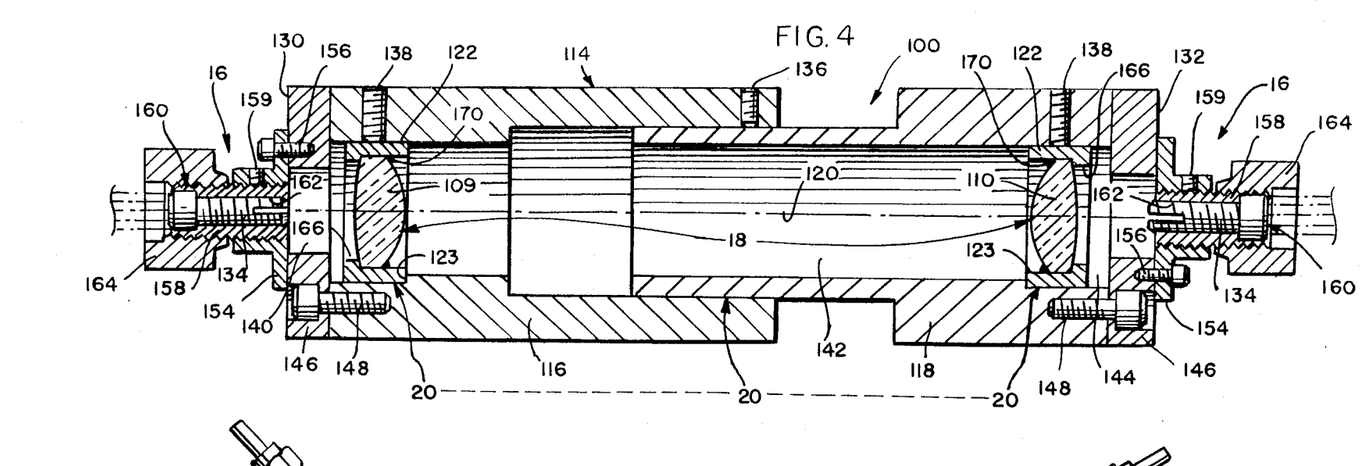
FIG. 4 is a sectional view of a transmissive mode distributive coupler constructed in accordance with the present invention.

In a transmissive mode (as shown in FIG. 4), the distributive coupler 100 is adapted for use with two sets 12 of optical fibers 14 by directing light transmitted through any one or more of the optical fibers 14 of one of the sets 12 of optical fibers onto all of the optical fibers 14 of the other set 12 of optical fibers. The transmissive mode distributive coupler 100 then includes means 16 at each end for supporting the end portions of the optical fibers 14 of the two sets 12 of optical fibers in spaced relation to one another. It also includes means 18 for directing the light transmitted through any one or more of the optical fibers 14 of one of the sets 12 onto all of the optical fibers 14 of the other of the sets 12 wherein the light directing means 18 comprises light shaping means 109 and light focusing means 110 disposed between the sets 12 of optical fibers. The transmissive mode distributive coupler 100 further includes means 20 for adjusting the position of the light directing means 18 relative to the fiber supporting means 16. With these features of construction, the distributive coupler 100 produces substantially uniform illumination of the other of the sets 12 of optical fibers 14 in the transmissive mode.

More particularly, the light shaping means 109 and the light focusing means 110 (illustrated in FIG. 4) are disposed within a housing 114 in the transmissive mode coupler 100. The housing 114 includes first and second housing segments 116 and 118 telescopically related to one another and lying along a common longitudinal axis 120 so as to define at least a portion of the position adjusting means 20. The first and second housing segments 116 and 118 are complementarily shaped and include means for supporting the light focusing means 110 in spaced apart relation to the light shaping means 109 (described hereinafter) such that the light focusing means 110 is supported in one of the housing segments 118 and the light shaping means 109 is supported in the other of the housing segments 116 so as to be movable toward and away from the light focusing means 110 by utilizing the portion of the position adjusting means 20 permitting the housing segments 116 and 118 to be moved telescopically relative to one another. The housing 114 further includes a pair of fiber optic terminals defining the fiber supporting means 16 and lying along the common longitudinal axis 120 of the first and second housing segments 116 and 118 with one of the fiber optic terminals 16 being associated with each of the housing segments 116 and 118 so as to be disposed at opposite ends 130 and 132 of the housing 114. Advantageously, the fiber optic terminals 16 each include a sleeve 134 supporting the end portions of the optical fibers 14 of one of the sets 12 in tightly packed relation (similar to FIG. 3) such that the end portions of any one set 12 are maintained parallel to one another and to the common longitudinal axis 120 thereby defining light transmission paths extending parallel to the common longitudinal axis 120 of the housing segments 116 and 118.

Referring again to FIG. 4, each of the sleeves 134 supports the end faces of the optical fibers 14 of one of the sets 12 in optical communication with the light shaping means 109, the light focusing means 110 and the end faces of the optical fibers 14 of the other of the sets 12. Both the light shaping means 109 and the light focusing means 110 are disposed between the end faces of the sets 12 of optical fibers with the optical fibers 14 of each of the sets being supported such that the end faces thereof are maintained in a plane perpendicular to the light transmission paths of the optical fibers 14. The light shaping means 109 includes a shaping element such as a lens and the light focusing means 110 includes a focusing element such as a lens both of which are disposed in the light transmission paths of all of the optical fibers 14. Both of the lenses 109 and 110 are movable toward and away from each other by utilizing the portion of the position adjusting means 20 permitting the housing segments 116 and 118 to be moved telescopically relative to one another. Further, each of the lenses 109 and 110 is advantageously mounted in a collar 122 defining means for supporting light shaping means 109 and the light focusing means 110 whereby the lenses 109 and 110 are separately movable toward and away from the end faces of the adjacent optical fibers 14 so as to define another portion of the position adjusting means 20.

It will be seen that the lenses 109 and 110 are disposed perpendicular to the common longitudinal axis 120 and the light transmission paths of the optical fibers 14. Further, the housing segment 116 includes means 136 in the form of a set screw for securing the housing segments 116 and 118 and the housing segments 116 and 118 each include means 138 also in the form of a set screw for securing the respective collars 122 which together permit the lenses 109 and 110 to be secured in selected positions of adjustment relative to the end faces of the adjacent optical fibers 14 and to each other so as to produce substantially uniform illumination of all of the optical fibers 14 of one of the sets 12 of optical fibers. Moreover, the lenses 109 and 110 are disposed intermediate the ends 130 and 132 of the housing 114 in spaced relation to each other and to the end faces of the optical fibers 14 of the sets 12 of optical fibers so as to divide the housing 114 into three separate chambers 140, 142 and 144 extending through the housing 114 along the common longitudinal axis 120 and the light transmission paths. If desired, the chambers 140, 142 and 144 can communicate through a passageway extending through the housing segments 116 and 118 and the housing 114 can include means for sealing the chambers 140, 142 and 144 against exposure to conditions external of the housing 114 in the manner taught hereinabove in connection with the reflective mode coupler alternative embodiment of FIG. 2.

Figure 5:
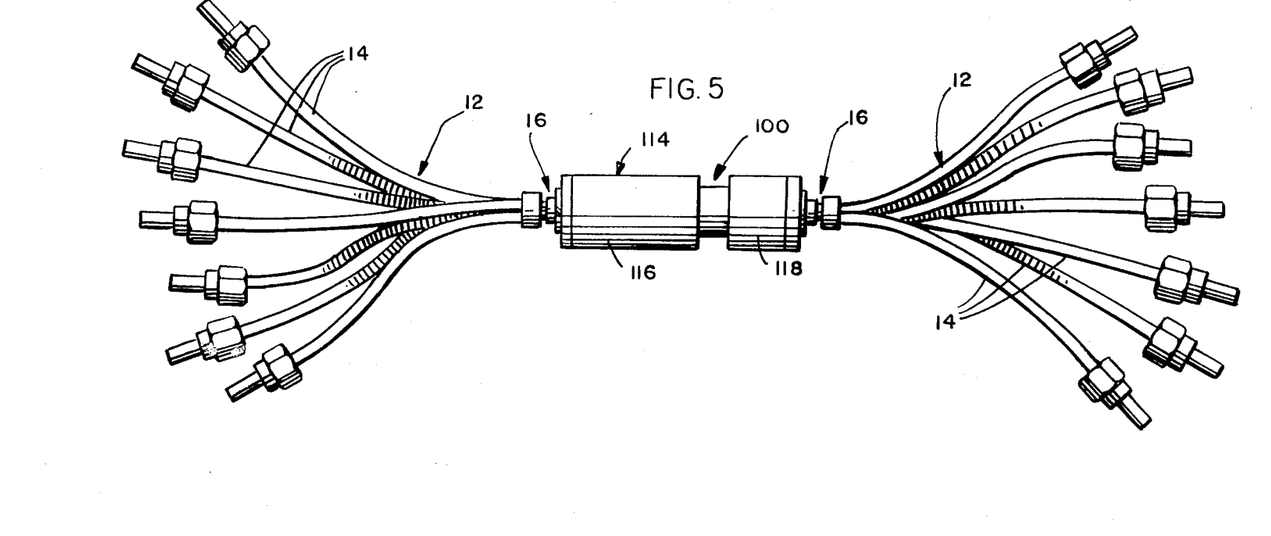
FIG. 5 is an elevational view of a transmissive mode distributive coupler constructed in accordance with the present invention.

Referring to FIGS. 4 and 5, the details of construction are similar to the details of construction of FIG. 1. The principal differences relate to minor changes in the fiber supporting means 16 and the collar 122. It will be seen, for instance, that the housing segment 116 includes an end cap 146 secured to the end 130 thereof by any suitable means such as screws 148 and the housing segment 118 also includes an end cap 146 secured to the end 132 thereof again by any suitable means such as screws 148. The corresponding fiber supporting means 16 then includes an internally threaded annular flange member 154 secured to each of the caps 146 by means of suitable fasteners such as screws 156. The annular flanges 154 receive suitable externally threaded adapters 158 which in turn are sized and shaped to receive fiber optic pins 160. It will be appreciated that the threaded adapters 158 permit adjustment of the fiber optic pins 160 which may thereafter be secured in selected positions of adjustment by means of set screws 159. It will be seen and appreciated that the fiber optic pins 160 are secured within bores 162 extending through the threaded adapters 158 by means of nuts 164. Of course, the fiber supporting means 16 at each end of the housing 114 are advantageously identical in construction to facilitate production.

Referring to the collars 122, the corresponding lenses 109 and 110 are secured therein against radial flanges 166 by any suitable means such as epoxy (as at 170). It will be seen that there is a stop 123 provided for the collars 122 as with the embodiment of reflective mode distributive coupler 10 illustrated in FIG. 1. It will be appreciated that the end caps 146 can be removed, the set screws 138 loosened, and the collars 122 moved along the common longitudinal axis 120 toward and away from the sleeves 134 in order to adjust the positions of the lenses 109 and 110 relative to the optical fibers 14. Likewise, the set screw 136 can be loosened to telescopically move the housing segments 116 and 118 relative to one another to adjust the position of the lenses 109 and 110 relative to one another all of which facilitates producing substantially uniform illumination of all of the optical fibers 14 of a set 12 of optical fibers.

While different lenses or lens combinations can be used in the present invention, it has been found that a single double convex lens is well suited for a reflective mode distributive coupler and generally plano-convex lenses are well suited for transmissive mode distributive couplers. The lenses effectively remove the necessity of matching the size of the mixing rods to the end face of a set of optical fibers as with prior art couplers. Basically, the use of lenses coupled with means for adjusting the position of the optical components renders it possible to produce substantially uniform illumination both in amount and angular distribution even from a nonuniform source.

Utilizing the features of the present invention, the distributive coupler can distribute the essentially monochromatic components of light from any optical fiber so that the amount and angular distribution of light incident on each optical fiber of a set of optical fibers is equivalent to equalize signal pulse shape in the fiber optic transmission lines after passage through the coupler. The coupler can be adjusted to be used with any type of fiber optic cable or with a different plurality of fiber optic transmission lines by only changing the distances between optical elements thereby rendering it unnecessary to change the optical elements. With the present invention, the optical elements collect, shape and direct light in a manner producing substantially uniform illumination of all of the optical fibers of a set of optical fibers.

With both the reflective mode and transmissive mode distributive couplers, the ideal position for the optical components can be determined for any particular optical fibers in conventional fashion by mere calculation. It is also possible to adjust the optical components in either mode by measuring the power in the optical fibers to determine when the power is essentially equivalent in all. Additionally, the transmissive mode optical coupler renders adjustment of the position of the optical components simple by merely removing one angular flange and placing translucent paper in its place to visually inspect the light distribution.

Regardless of the manner selected for adjusting the position of the optical components, the present invention provides a significantly improved distributive coupler for distributing light among fiber optic transmission lines so that one or two way communication is possible from any one or more optical fibers of a set of optical fibers to all of the optical fibers of the same or a different set of optical fibers. It is clear that the objective of providing a coupler capable of distributing an optical signal to a plurality of locations has been achieved in a manner producing substantially uniform illumination of an entire set of optical fibers utilizing the light transmitted through any one or more optical fibers without excessive loss of light or excessive distortion of light signal pulses. In addition, the present invention provides a distributive coupler which facilitates easy adjustment of the optical components for use with different types of optical fibers and different pluralities of optical fibers in a manner capable of fabrication at reasonable cost and to acceptable tolerances.

While in the foregoing specification a detailed description of the inventive concepts have been set forth for purposes of illustration, the details herein given may be varied by those skilled in the art without departing from the spirit and scope of the invention set forth and defined by the appended claims.

I claim:

1. A distributive coupler for coupling light between at least one optical fiber and a set of optical fibers comprising:
   means for supporting said one optical fiber and said set of optical fibers;
   means for directing light transmitted through said one optical fiber toward said set of optical fibers, said transmitted light being directed along a light transmission path; and
   means for readily adjusting said directing means axially of said light transmission path for adjusting the length of said light transmission path to enable said light directing means to direct said transmitted light uniformly onto all of the optical fibers of said set.

2. A distributive coupler in accordance with claim 1 including a housing have at least one internal chamber in optical communication with said one optical fiber and said set of optical fibers, said chamber defining said light transmission path and said light directing means being disposed in said chamber, and wherein said path length adjusting means adjusts the length of said housing chamber.

3. A distributive coupler in accordance with claim 2 wherein said path length adjusting means comprises first and second segments of said housing, said first and second housing segments being in telescoping engagement for adjusting the length of said light transmission path.

4. A distributive coupler in accordance with claim 1 wherein said set of optical fibers includes said one optical fiber, and wherein said light directing means includes means for reflecting light transmitted through said one optical fiber back onto all of the optical fibers of said set.

5. A distributive coupler in accordance with claim 4 wherein said light transmission path extends from said one optical fiber to said reflecting means and back to said set of optical fibers, and wherein said path length adjusting means enables selective positioning of said set of optical fibers and said reflecting means relative to one another.

6. A distributive coupler in accordance with claim 5 wherein said light directing means includes means interposed between said reflecting means and said set of optical fibers for focusing said reflected light onto all of the optical fibers of said set.

7. A distributive coupler in accordance with claim 6 wherein said path length adjusting means includes means for positioning said focusing means along said light transmission path.

8. A distributive coupler in accordance with claim 1 wherein said light directing means is interposed between said one optical fiber and said set of optical fibers, wherein the distance between said one optical fiber and said set of optical fibers defines the length of said light transmission path, and wherein said path length adjusting means enables selective positioning of said one optical fiber and said set of optical fibers relative to one another for adjusting the length of said light transmission path.

9. A distributive coupler in accordance with claim 8 wherein said path length adjusting means includes means for positioning said light directing means along said light transmission path.

10. A distributive coupler in accordance with claim 9 wherein said light directing means comprises first optical means directing said transmitted light toward said set of optical fibers and second optical means interposed between said first optical means and said set of optical fibers for focusing said transmitted light onto said set of optical fibers.

11. A distributive coupler in accordance with claim 10 wherein said path length adjusting means includes means for independently positioning said first optical means and said second optical means along said light transmission path.

12. A distributive coupler for use with a set of optical fibers, comprising:
a housing including means for supporting the end portions of said optical fibers;
means for directing light transmitted through any one or more of said optical fibers onto said set of optical fibers, said light directing means including means for reflecting transmitted light toward said set of optical fibers and means for focusing reflected light onto said set of optical fibers, said light focusing means and said light reflecting means being disposed within said housing with said light focusing means between said fiber supporting means and said light reflecting means, said transmitted light being directed along a light transmission path within said housing; and
means for readily adjusting said directing means axially of said light transmission path for adjusting the optical length of said light transmission path to produce uniform illumination of said set of optical fibers.

13. The distributive coupler as defined in claim 12 wherein said housing includes first and second housing segments, said first and second housing segments being telescopically related to one another so as to define at least a portion of said optical length adjusting means.

14. The distributive coupler as defined in claim 13 wherein said light focusing means is supported in one of said housing segments and said light reflecting means is supported in the other of said housing segments, said light reflecting means being movable toward and away from said light focusing means by utilizing said portion of said optical length adjusting means permitting said housing segments to be moved telescopically relative to one another.

15. The distributive coupler as defined in claim 14 wherein said fiber supporting means comprises a fiber optic terminal, said fiber optic terminal including a sleeve supporting the end portions of said optical fibers in tightly packed relation, said optical fibers being supported such that the end portions thereof are maintained parallel to one another thereby defining light transmission paths extending parallel to said common longitudinal axis of said housing segments.

16. The distributive coupler as defined in claim 15 wherein said light focusing means includes a lens and said light reflecting means includes a mirror, said lens and said mirror being disposed in said light transmission paths of said optical fibers and said mirror being movable toward and away from the end faces of said optical fibers by utilizing said portion of said optical length adjusting means permitting said housing segments to be moved telescopically relative to one another, said lens being mounted in a collar within said housing and being separately movable toward and away from the end faces of said optical fibers so as to define another portion of said optical length adjusting means.

17. The distributive coupler as defined in claim 16 wherein said lens divides said housing into two separate chambers in communication with one another, said chamber communicating through a passageway extending through at least one of said housing segments, said housing including means for sealing said chambers against exposure to condition external of said housing.

18. A distributive coupler for use with two sets of optical fibers, comprising:
a housing supporting the end portions of said optical fibers, said optical fibers of one of said sets being supported in spaced relation to said optical fibers of the other of said sets;
means for directing light transmitted through any one or more of said optical fibers of one of said sets onto all of said optical fibers of the other of said sets, said light directing means including means for focusing light onto all of said optical fibers of the other of said sets, said light focusing means being disposed within said housing between said sets of optical fibers, said transmitted light being directed along a light transmission path; and
means for readily adjusting said directing means axially of said light transmission path for adjusting the optical length of said light transmission path to produce uniform illumination of all of said optical fibers of the other of said sets of optical fibers.

19. A distributive coupler in accordance with claim 18 wherein said housing includes first and second housing segments, said first and second housing segments being telescopically related to one another so as to define at least a portion of said optical length adjusting means.

20. A distributive coupler in accordance with claim 19 including light shaping means supported in one of said housing segments with said light focusing means being supported in the other of said housing segments, said light shaping means being movable toward and away from said light focusing means by utilizing said portion of said optical length adjusting means permitting said housing segments to be moved telescopically relative to one another.

21. A distributive coupler in accordance with claim 20 wherein said housing includes a pair of fiber optic terminals, one of said fiber optic terminals being associated with each of said housing segments and being disposed such that said fiber optic terminals are located at opposite ends of said housing, each of said fiber optic terminals including a sleeve supporting the end portions of said optical fibers of one of said sets in tightly packed relation, said optical fibers being supported such that the end portions of any one set are maintained parallel to one another thereby defining light transmission paths extending parallel through said housing segments.

22. A distributive coupler in accordance with claim 21 wherein each of said light shaping means and said light focusing means includes a lens, each of said lenses being disposed in said light transmission paths of said optical fibers and being movable toward and away from the other of said lenses by utilizing said portion of said optical length adjusting means permitting said housing segments to be moved telescopically relative to one another, each of said lenses being mounted in a collar within said housing and being movable toward and away from said sleeves so as to define another portion of said optical length adjusting means.

* * * * *